FIG. 1.

July 30, 1963  N. E. STROMBERG  3,099,204
BUNDLE BINDING MACHINE

Filed March 13, 1959  8 Sheets-Sheet 2

3,099,204
Patented July 30, 1963

3,099,204
BUNDLE BINDING MACHINE
Nils Erik Stromberg, Tivoligatan 20, Sundsvall, Sweden
Filed Mar. 13, 1959, Ser. No. 799,314
Claims priority, application Sweden Aug. 22, 1956
4 Claims. (Cl. 100—28)

This application is a continuation-in-part of my application Serial No. 676,337 filed August 5, 1957 for Bundle Binding Machine, now abandoned.

This invention relates to machines for binding bundles of paper pulp by means of a binding band or wire. More particularly, the invention relates to machines of that character which are provided with a rotatable annular guiding member for the binding material said guiding member being adapted to surround the object to be bound during the binding operation.

An object of the invention is to provide a machine of said type which allows the use of a conveyor for the bundles or packages which extends uninterruptedly through said guiding member and in which machine a thicker and stronger binding material, particularly thicker wire, may be used than was hitherto practicable. In well-known machines of said character the length of binding material supplied in excess, i.e. the length of binding material corresponding to the difference between the length of the circumference of the annular guiding member and the length of the circumference of the bundle or package to be bound, is usually compensated for by laying the binding material principally like a rope in a double tackle with double blocks which elements are mounted yieldingly with respect to each other so that they can take up the slack automatically. Owing to the large number of folding or breaking points appearing in such machines only comparatively thin wire may be used as binding material unless bulky guiding devices are provided in order to allow the use of thicker wire.

Another object of the invention is to provide a machine of the character set forth in which the number of movable elements is considerably reduced as compared with that of well-known machines of this type and in which during the rotating movement of the annular binding material guiding member no other mechanically controlled movements are required in addition to said rotating movement.

A machine according to the invention is substantially characterized in that its wire guiding member is adapted first to make one revolution in one direction thereby winding binding material one turn around itself and then to make one revolution in the other direction thereby wrapping the binding material around the object to be bound.

During the first-mentioned revolution of the guiding member the length of wire not required for the wrapping operation and corresponding to the difference between the circumference of the wire guiding ring and the circumference of the bundle, that is to say, the slack, is withdrawn from the ring by means of wire feed rollers while rotating "backwards."

In the accompanying drawings a machine according to the invention is illustrated in a substantially diagrammatic manner.

in FIG. 1.

The bundle binding machine shown on the drawings comprises a support frame 1 having a base 2 with a front wall 3, side walls and a rear wall. The table top 4 of the base is provided with a number of rollers 5 for supporting an object, for instance, a bundle of paper pulp, 6 to be bound. This object is preferably brought to said table top by means of a roller way (not shown) placed in front of the machine. After the binding is completed the object can be removed on said roller way or by means of a second roller way (not shown) behind the machine. The support frame 1 also includes a vertically disposed ring-shaped frame 7 parallel with the front wall substantially flush with the same and rising from the base 2 thereby forming an opening for receiving the object 6.

The frame 7 carries a number of circumferentially spaced roller bearings 8 forming a support for a rotatable wire guiding ring 9 having circumferentially spaced wire guiding rollers 10 rotatably mounted on studs 11. The rollers 10 are equally spaced with the exception of a roller 10' which is positioned rather close behind a roller 10 in an anti-clockwise directional rotation of the ring 9.

The front of the machine is substantially closed by a cover 12. The machine preferably also carries a vertically disposed hydraulic or pneumatic cylinder 13 the piston rod of which carries a cross bar 14 for engaging the top of an object 6 and firmly biasing this against the table top 4 during the binding operation.

The guiding ring 9 has a gear rim meshing with a gear wheel 15 preferably belt driven by a main motor 16 supported by a bracket attached to the support frame. The gear wheel 15 is carried by a wire feeding device 17 and is carried by the outer end of a shaft 19 provided with a gear wheel 21 meshing with a gear wheel 22 on a second shaft 20 carrying a pulley 18. The gear wheel 21 is connected with a co-axial gear wheel 23 meshing with a gear wheel 24 loosely mounted on the pulley shaft 20. This gear wheel 24 meshes with a gear wheel 25 also loosely mounted on a third shaft 26 parallel with the other shafts 19 and 20. Attached to this third shaft is a gear wheel 27 and at the outer end of the same a lower wire feeding roller 28 having one or several grooves for receiving the wire. Between the gear wheel 25 and the gear wheel 27 on the shaft 26 is a friction clutch 29 which is actuable by means of a pressure device including a hand wheel 30. A clockwise rotation of this hand wheel thus brings the gear wheels 25 and 27 closer to each other so that the friction clutch 29 will transfer a rotational movement of the gear wheel 25 to the gear wheel 27. The gear wheel 27 meshes with a gear wheel 34 mounted on a fourth shaft 31 carrying at its outer end another wire feeding roller 35 in engagement with the above mentioned wire feeding roller 28. The dimensions of the gear wheels 27 and 34 and of the wire feeding rollers 28 and 35 are such that said rollers will obtain the same peripheral speed. The shaft 31 is carried by a slide block 32 which is yieldingly pressed towards the shaft 26. The slide block 32 can be moved back by means of a handle 33 thereby forming a gap between the wire feeding rollers for inserting a wire between the same. The dimensions of the gear wheels 15, 21, 22, 23, 24, 25, 27, and 29 and of the wire feeding rollers 28 and 35 are such in relation to the dimension of the gear rim of the wire guiding ring 9, that the latter will obtain a peripheral speed which is slightly higher than that of said feeding rollers. The winding operation later described of the guiding ring 9 can be carried out due to the friction clutch between the gear wheel 15 and the feeding rollers 28, 35.

Figure 1:
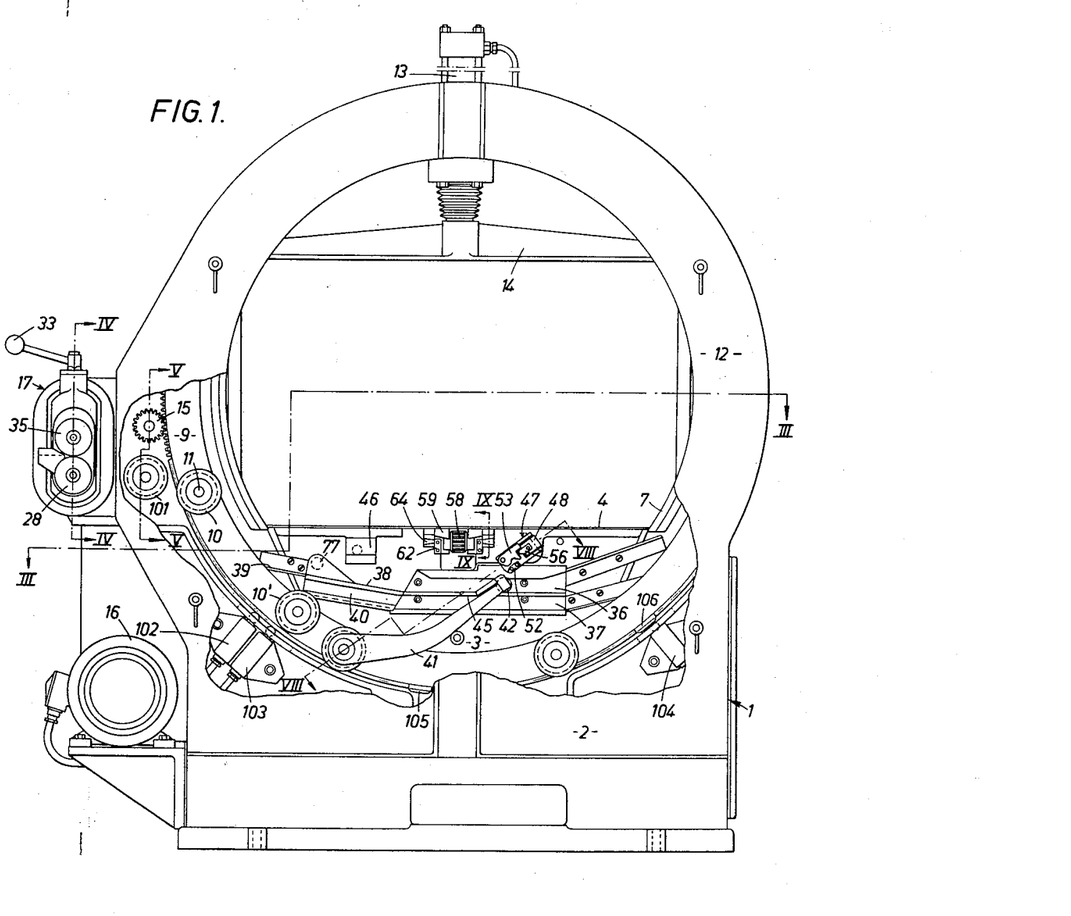
FIG. 1 shows a front view of the machine with part of its cover broken away.

The frame base 2 carries on its front wall 3 an upper 36 and a lower 37 stationary track of which the latter in itself or by means of a co-operating track extend to the wire feeding ring 9 (to the right in FIG. 1). The front wall also carries an upper movable track 38 having a stationary extension 39 to the ring 9. There is also provided a lower movable track 40. In the lowermost position of the movable tracks, the tracks 40 and 37 communicate with each other and with the wire guiding ring 9 to the right in FIG. 1. In the same position the tracks 36 and 38 communicate with each other and with the extension 39 to the left in FIG. 1. The movable tracks 38 and 40 are attached to a shaft 77 extending through the front wall 3 and rotatably journalled in the same.

Figures 8, 9:
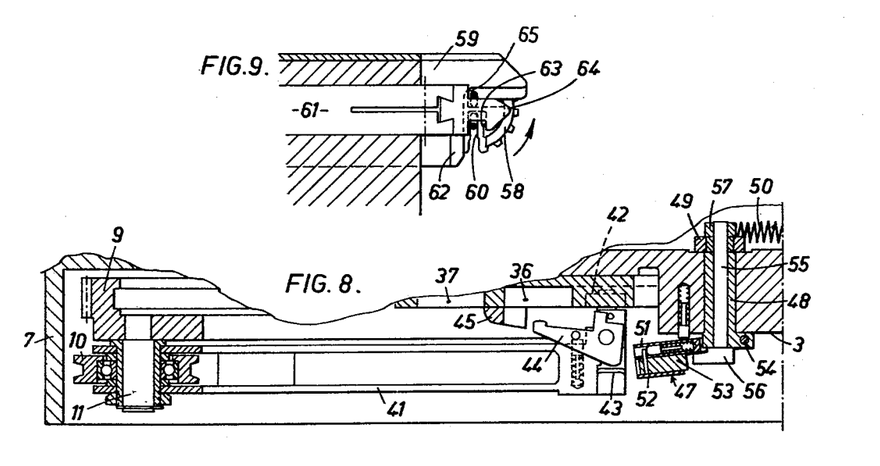
FIG. 8 is a sectional view of the wire gripper arm along the broken line VIII—VIII in FIG. 1.
FIG. 9 is a sectional view along the line IX—IX in FIG. 1 showing part of the cutting and twister mechanism.

The wire guiding ring stud 11 positioned close to the special wire guiding roller 10 carries a wire gripper arm 41 supporting at its free end a roller 42 to be guided by said tracks 36—40. The roller 42 and said tracks are so arranged that the roller upon a clock-wise rotation of the ring 9 will be guided into the lower tracks 37 and 40 and upon a counterclockwise rotation will be guided into the upper tracks 38 and 36. The gripper arm 41 also carries near its free end a wire gripper comprising a fixed jaw 43 and a movable jaw 44 spring biased against the jaw 43 (FIG. 8). When rotating counter-clockwise the gripper arm roller 42 as mentioned above is directed into the upper stationary track 36 through the movable track 38 and its extension 39. The wire guiding ring 9 is stopped with the gripper arm 41 in the position shown in FIGS. 1 and 10 in which the movable jaw 44 has just been opened by the action of a stationary cam 45 between the tracks 36 and 37. (The movable jaw is to this effect provided with an extended arm.) The gripper of the gripper arm 41 can also be opened in the FIG. 12 position by the action of a cam operated pressure plate 46.

Figure 14:
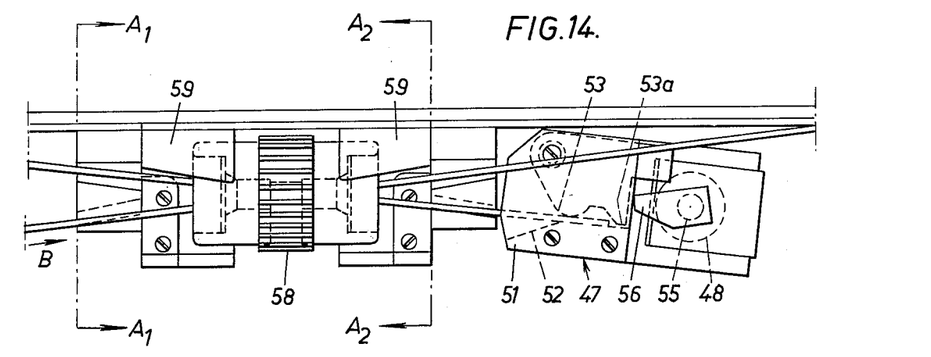
FIG. 14 is an elevation on a larger scale of the twisting mechanism and the stationary gripper.

A stationary gripper referred to in general as 47 is carried by a hollow shaft 48 rotatably journalled in the front wall 3 (FIG. 8). 49 is an arm attached to said hollow shaft inside the machine and biasing the gripper 47 to the position shown in FIG. 1 by means of a spring 50. The gripper 47 includes a plate 51 having a fixed jaw 52 and a movable jaw 53 preferably spring biased against the fixed jaw. The plate 51 is carried by the hollow shaft 48 on a screw pin 54 as is clear from FIG. 8 and is spring biased outwardly to a position right in front of the gripper of the movable gripper arm 41 when the latter is in a position immediately before the position shown in FIG. 1. It should be noted that the movable jaw 53 is so arranged that the wire can be brought right into and through the gripper 47 without any gripping action occurring between the jaws 52 and 53. However, when the end of the wire upon a pull backwards leaves a specially provided tongue 53a, FIG. 14, the movable jaw 53 is free to latch the wire against the fixed jaw 52 by means of a spring shown in FIG. 8.

The hollow shaft 48 receives a shaft 55 having a tongue 56 for engaging the movable jaw 53 to lift the same for releasing the wire butt after the cutting of the wire. At the other end the shaft 55 carries an arm 57 to be actuated in a manner described later.

A twining or twisting mechanism and a wire cutting mechanism are shown in FIGS. 1, 9, 15, 16, and 17. 58 is a twister comprising a cylindrical, externally toothed portion and on each side of this a bearing portion. The twister is rotatably journalled in bearings 59 on the front wall 3 just beneath the table top level. The twister also has an axially extending and open-ended slot 60 having a width corresponding to the thickness of the wire and having such a depth that it can hold two wires adjacent each other with their common centre coinciding with the axis of the twister.

Figure 15:
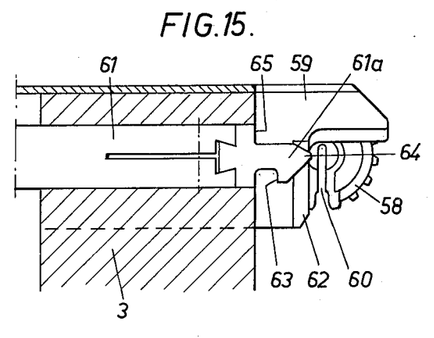
FIGS. 15, 16, and 17, are cross-sectional views taken on either of the lines $A_1$, $A_1$; or $A_2$, $A_2$ of FIG. 14 showing the cutter in normal position (FIG. 15) and in two positions of operation.
Figure 16:
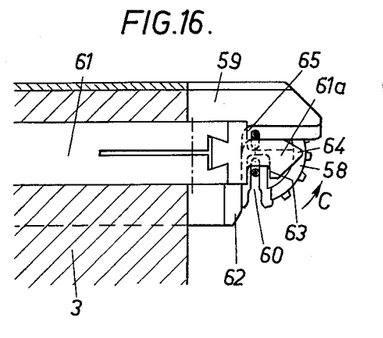
Figure 17:
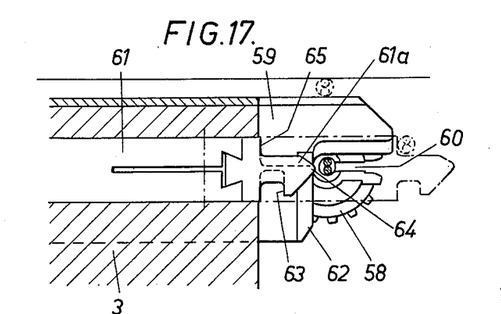

The wire cutters each comprise a slide member, designated by 61 in FIG. 9 as well as in FIGS. 15 to 17, slidably mounted in a guideway in the front wall 3, and a cutter head, designated by 61a in FIGS. 15–17 which is clamped in a dovetail groove formed in the slit end of the slide member. Each cutter has a cutting edge 63 co-operating with a stationary cutting edge 62 upon a movement backwards with the wire positioned in a slot 60. The heads of the cutters 61 are wedge shaped as at 64 and have a shoulder 65 to push the twisted wire outwards and over the twister bearings 59. The cutters 61 are connected with each other by means of a bridge member 66.

In the normal position of the cutter shown in FIG. 15 the slot 60 of the twister is open downwardly and the cutter head 61 is removed from the range of said slot. In this position the placing of the wire around the bundle to be bound is effected. This operation being completed the position will be that shown in FIG. 14. From the gripping device 47 the wire passes through slot 60 of the twister, thence round the bundle and hence again through slot 60 and finally back to the wire guiding ring. During this winding of the wire round the bundle the wire had been unwound from the wire guiding ring in the direction indicated by the arrow B in FIG. 14.

In the twister the wire parts cross each other under a small angle instead of extending parallel to each other, as was hitherto common practice. The cutters which during the winding operation remained in their normal position, as shown in FIG. 15, out of the path of the wires, will be displaced following the completed winding operation, to the right in the drawing. During this movement the cutter heads are allowed, due to the said angle between the wire parts, to enter therebetween and move them apart, as shown in FIG. 16, with one wire part lying on the upwardly facing back of the cutter head and the other wire part engaging the recess formed in the lower edge of the cutter head. The twister 58 is then caused to rotate a desired number of revolutions in the direction indicated by the arrow C in FIG. 16. While the portions of the wires in engagement with the twister are thus twisted together, the wire portions external of the twister are prevented from being twisted together. It is thus seen that the cutter heads limit the length of twisting to the distance fixed between the cutter heads. The twisting operation being completed, the twister is stopped in the position shown in FIG. 17, that is to say, with the slot 60 pointing horizontally outwards.

The cutters are then restored to normal position, shown by full lines in FIG. 17. During this restoration the lower wire part is cut through by the action of the knife edge 63 of each cutter head in cooperation with the stationary knife 62 provided at the respective bearing 59. The cutter heads then move to the position shown by dotted lines in FIG. 17, thereby removing the ready twisted wire from the twister. Due to the tensions of the ready twisted wire the twist will be stretched immediately up against the bounded object.

The twister and the cutters then return to their normal positions shown in FIG. 15.

The movable tracks 38, 40, the tongue 56 for releasing the wire butt, the pressure plate 46, the twister 58 and the cutters 61 are driven by a second motor 67 carried preferably on the rear wall of the base 2. This motor drives by means of a worm gear 71, 72 a shaft 68 extending transversally to the axis of the wire guiding ring 9 and rotatably carried by walls 69, 70 in the base 2. 73 is a third stationary shaft carrying a number of pivot means for a purpose later described. The shaft 73 is parallel with the shaft 67 and is also supported by the walls 69 and 70.

The cam shaft 68 carries a cam wheel 74 having a track or groove 75 receiving a roller at the end of an arm 76. This arm is attached to the shaft 77 carrying the movable tracks 38, 40. It should be noted at this point that the cam shaft 68 is adapted to perform one revolution during each cycle of the binding machine. The cam wheel 74 and its track 75 are so arranged that one revolution of said wheel will impart one movement up and down of said tracks.

The cam shaft 68 also carries a cam wheel 78 actuating a roller 79 on one arm of a first bell crank 80 pivotably mounted on the shaft 73 and adapted to actuate a push rod extending through the front wall 3 said push rod outside the front wall carrying the pressure plate 46. Also the cam wheel 78 is so arranged that one revolution of the same will impart one movement outwards and back of the pressure plate 46.

A third cam wheel 81 carried by the cam shaft 68 is provided on one side with a groove 82 for guiding a roller (not shown) at the end of one arm of a second bell crank 83. The other arm of this bell crank is pivotably connected with the bridge member 66 of the cutting mechanism. The groove 82 is so shaped that one revolution of the cam shaft 68 will impart one movement outwards of the cutters 61, one movement back of the cutters for cutting the wire, one movement again outwards of the cutters for pushing the twisted wire outwards by means of the shoulders 65 and finally one movement back of the shoulders 65 and finally one movement back of the cutters.

The other side of the third cam wheel 81 has a cam 84 for actuating a pivotably mounted link 85 which by means of a spring is pressed against said cam wheel. The link 85 is by means of another link 86 connected with the arm 57 for actuating the tongue 56 of the stationary gripper 47. One revolution of the cam shaft 68 will impart one movement back and forth of said tongue.

Figures 2, 7:
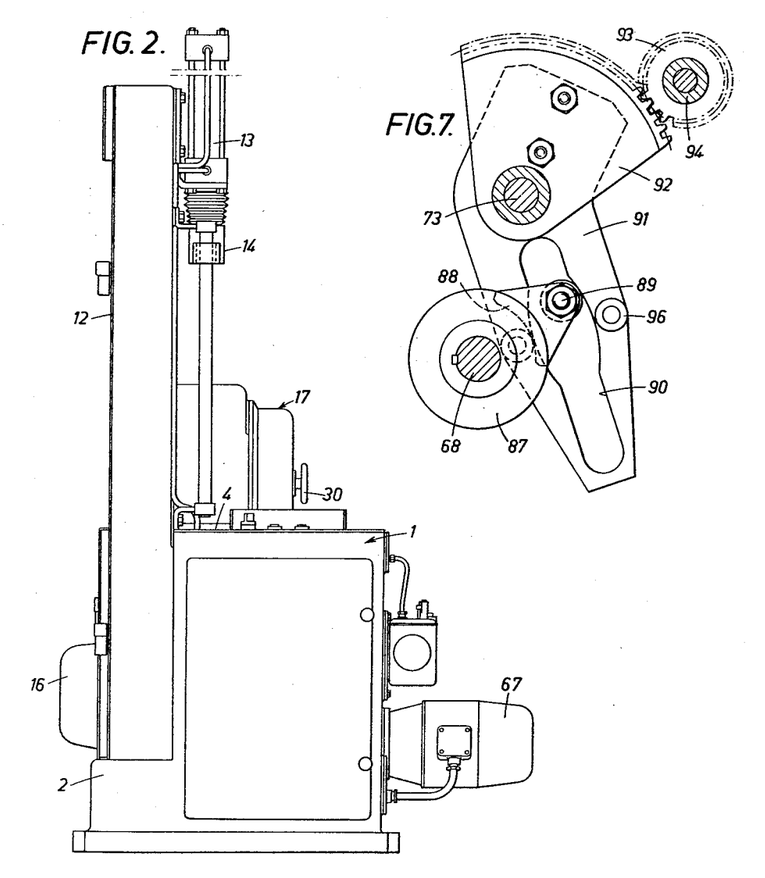
FIG. 2 is a side view of the machine.
FIG. 7 is a sectional view of the twister driving mechanism along the line VII—VII in FIG. 6.
Figure 3:
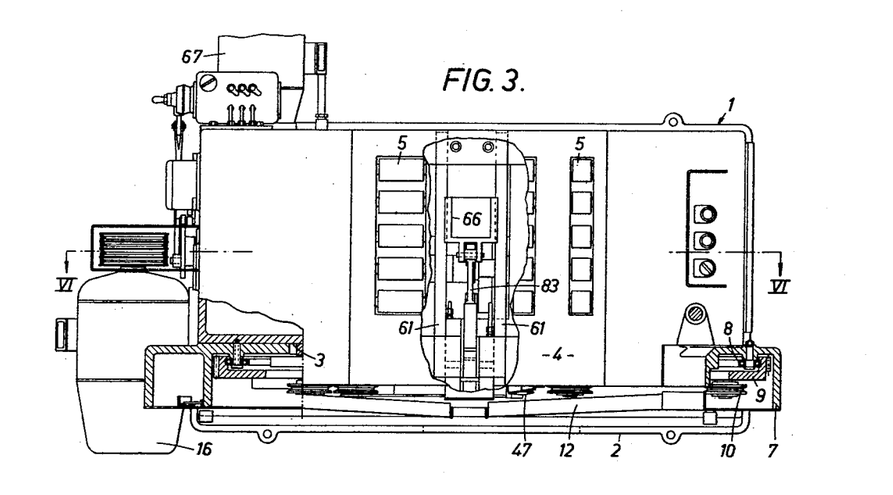
FIG. 3 is a sectional view along the line III—III in FIG. 1 showing the table top with part of the same broken away.
Figure 4:
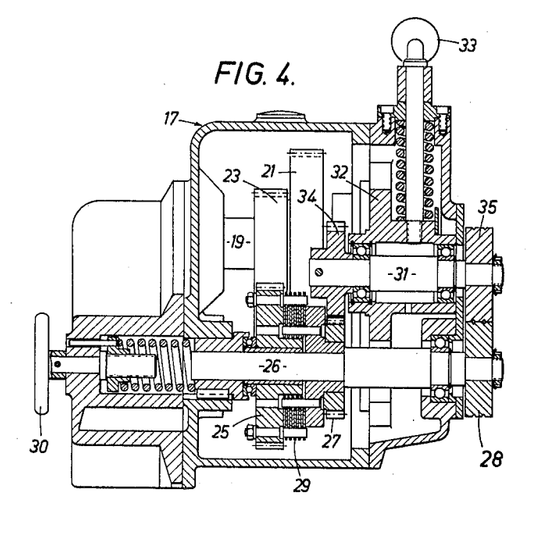
FIGS. 4 and 5 are sectional views of the wire feeding device along the lines IV—IV and V—V resp.
Figure 5:
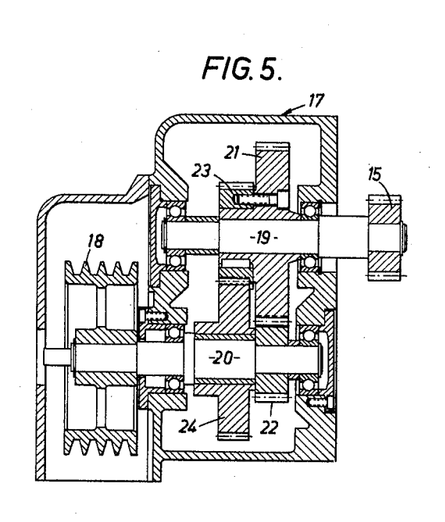

The cam shaft finally carries at its end a fourth cam wheel 87 having a rib 88 (FIGS. 1 and 7) and a pin 89 provided with a roller. This roller is received in a slot 90 in a pivot member 91 pivotably mounted on the stationary shaft 73. The pivot member 91 carries a toothed segment 92 meshing with a gear wheel 93 on a shaft 94 parallel with the shafts 68 and 73 and provided with a second gear wheel 95 meshing directly or through another gear wheel with the twister 58. 96 are rollers on the pivot member 91 for bringing the pin 89 to follow the contour of the slot 90 strictly by engagement with the rib 88. One revolution of the cam shaft 68 will from a starting point with the twister in a position with its slot 60 directed downwards at first impart a rotation of the twister 3–5 revolutions to a position with the twister slot directed outwards. In this position the cutters will cut the wires, i.e. the wire butt sitting in the stationary gripper 47 and the wire leading to the feeding device 17, and then push the twisted wire by means of their shoulders 65 outwards and over the twister bearings 59 thereby permitting the same to lie close to the bottom of the object 6. After this operation the twister 58 will rotate idly to its starting position with the slot 60 directed downwards for accommodating the wire.

97—100 refers to distance sleeves on the cam shaft 68 and on the shaft 73.

The relative arrangement and co-operation of the elements described above will now appear from a description of the operation of the machine.

Figure 10:
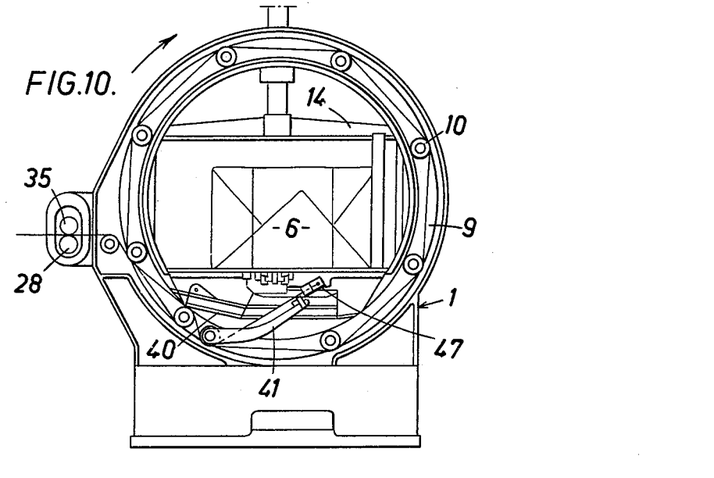
FIGS. 10-13 finally show four diagrammatic front views of the machine in different stages of operation.
Figure 11:
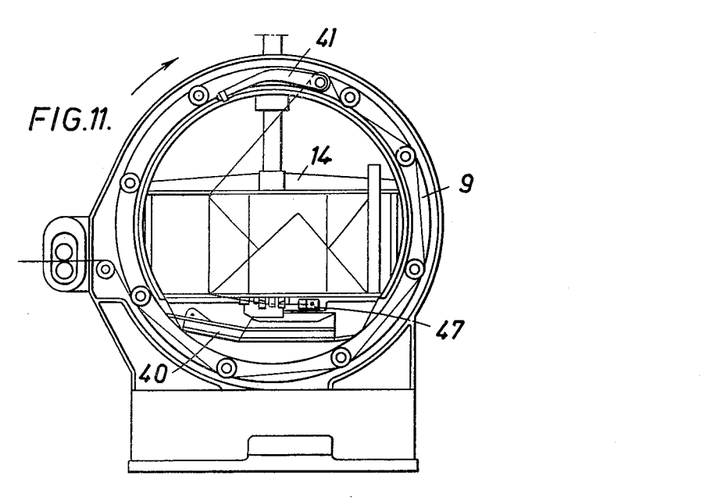

In a starting position shown in FIG. 10 for performing a wrapping cycle the wire is wound one turn around the wire guiding ring 9 and its rollers 10 (inside the roller 10′), its free end being held by the stationary gripper 47. Placed on the table 4 is an object 6 to be wrapped. At this moment the guide roller 42 of the gripper arm 41 is positioned in the upper stationary track 36 (FIG. 1) the gripper arm just having delivered the wire to the stationary gripper 47 and then released the wire by the action of the cam 45. To initiate the wrapping cycle the wire guiding ring 9 is started in clockwise direction. The wire will then immediately be latched by the stationary gripper 47 due to the pull of the wire. During rotation of the ring the wire will be wrapped around the bundle, as will appear from FIG. 11 which shows half the binding cycle completed. In the meantime the feed rollers 28, 35 rotate backwards to take up the slack thereby driven by the ring 9 and the gear wheel 15. As part of the wire around the ring 9 will be used for binding the object 6 the "return" speed of the wire will be less than the peripheral speed of the feeding rollers, and so the friction clutch 29 is adapted for compensating for these different speeds. A compensation particularly in operation when the wire is wrapped around the edges of the object 6 is also provided by the roller 101, which is movable up and down and thereby spring biased upwards.

Figure 6:
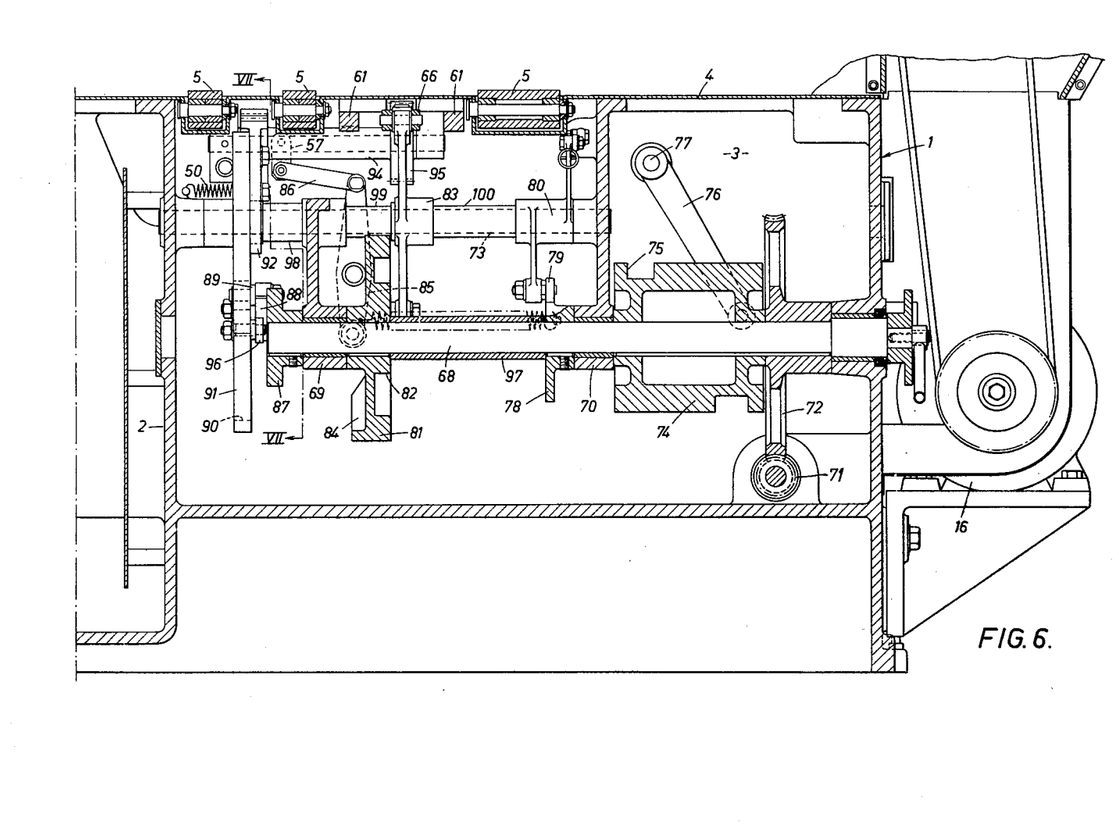
FIG. 6 is a sectional view along the line VI—VI in FIG. 3.
Figure 12:
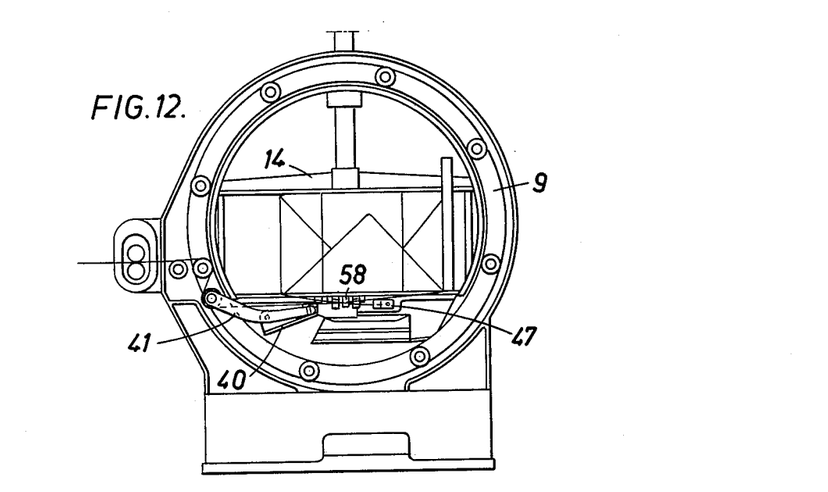
Figure 13:
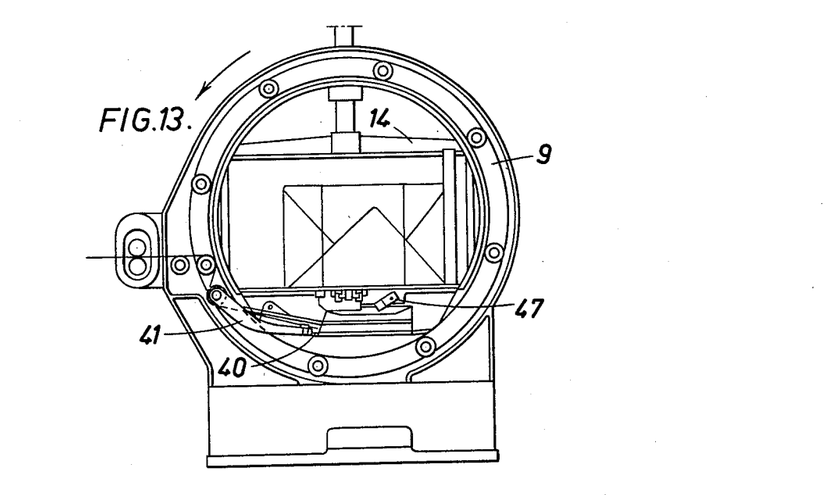

After the wire guiding ring has made slightly more than one revolution in the said direction it is stopped in the position shown in FIG. 12 though with the gripper arm 41 and the movable tracks 38, 40 in the position shown in FIG. 13. In this position the auxiliary motor 67 is started and the following operations performed by means of the mechanism shown in FIG. 6.

The movable tracks 38, 40 are raised to the position shown in FIG. 12 (by means of the cam wheel 74). At the same time the gripper 43, 44 is opened by the presser plate 46 (by means of the cam wheel 78) for receiving the wire. The cutters 61 are also moved out (by means of the cam wheel 81, 82) thereby entering into the angles between the wire parts. The twister 58 is then brought into action (by means of the cam wheel 87) twisting the wire parts for instance 3–5 turns. The twister is stopped with its slot 60 directed outwards and the cutters start moving inwards thereby cutting the wire part sitting in the stationary gripper 47 and the wire leading to the feeding device 17. After this operation the twister starts rotating back to its original position with the slot 60 directed downwards and cutters start moving outwards thereby pushing the twisted wire with their shoulders 65 outwards so that it can snap over the twister bearings 59 and place itself close to the under side of the wrapped object 6. The cutters are then moved back into the front wall 3. However, before the cutting the presser plate 46 is moved back to permit the movable jaw 44 to latch the wire at the end of the gripper arm.

After the cutting is performed the movable tracks 38, 40 are lowered to the position shown in FIG. 13. Also the stationary gripper 47 is swung downwards due to the action of the spring 50. Finally the tongue 56 will raise the moveable jaw 53 of the gripper 47 for a short time (by means of the cam wheel 81, 84) thereby releasing the wire butt.

All the said operations of the movable tracks 38, 40, the presser plate 46, the twister 58, the cutters 61 and the tongue 56 are performed by one revolution of the shaft 68 after which said shaft is stopped.

The main motor 16 is then started in opposite direction and the wire guiding ring is rotated counter-clockwise slightly more than one revolution to the position shown in FIGS. 1 and 10. During the rotation of the ring 9 the feeding rollers 28, 35 will rotate in their "forward" direction to supply another length of wire to the ring 9. Since, however, their peripherical speed is somewhat below that of the wire guiding ring the wire will be kept stretched during the laying of the wire on the rollers 10 by a tension depending on the adjustment of the friction clutch 29. At the end of the winding cycle the claw 43, 44 of the gripper arm 41 reaches such a position in relation to the stationary wire gripper 47 as to bring the end of the wire projecting beyond the gripper claw 43, 44 into engagement with the gripper 47. At almost the same instant the movable gripper jaw 44 will be opened by the action of the cam 45.

One binding cycle is now completed. When the ring 9 at the beginning of the next cycle starts rotating clockwise the wire will be automatically latched by the gripper 47.

In a preferred embodiment of the invention the binding machine operates automatically. For this reason the ring frame is provided with three stop limit switches 102—104 according to FIG. 1 as well as is the wire guiding ring provided with abutments 105, 106 for operating said switches. The abutment 106 is arranged to operate the switches 103 and 104 of which the latter is adapted to stop the ring 9 in the position shown in 1 and 10 and to start the ring in opposite direction (clockwise). The abutment 105 is arranged to operate the switches 103 and 102 of which the latter is adapted to stop the ring in the position shown in FIGS. 12 and 13 and to start the cam shaft operating motor 67. The switch 103 is adapted to eliminate the action of the switches 102 and 104 every second time of their actuation by the abutments 105 and 106 resp. This arrangement is necessary because the ring 9 travels slightly more than one turn in each direction.

There is also provided a stop limit mechanism for stopping the cam shaft 68 after one revolution and for starting the ring 9 in counter clockwise direction.

I claim:

1. A machine of the class specified comprising in combination, a supporting table for an object to be bound with a strand of binding material, a member rotatably surrounding a bundle of paper pulp on said support, means on said rotatable member for placing slightly more than one turn of binding strand around said member during a first cycle of rotation thereof in one direction and for laying said turn of binding strand around said bundle on the support during a following cycle of rotation of the member in the opposite direction, means provided outside said rotatable member for feeding binding strand thereto during said first cycle of rotation, a first gripping means on said rotatable member for holding the free end of the binding strand during said first cycle or rotation, means for actuating said first gripping means, stationary gripping means for holding a cut end of said binding strand during said cycle of rotation in the opposite direction, means for rotating the rotatable member in the opposite directions, means under the control of the rotatable member for imparting a return movement of the binding strand feeding means during said rotation in the opposite direction to take up slack of the binding strand, rotatable means for twisting the binding strand as laid around said bundle at a point where the part of the strand around said bundle overlaps the end of the strand held by the stationary gripping means and means including two cutters slidably mounted on the opposite sides of the twisting means for entering in a given angular position of the rotatable twisting means into between the strand parts projecting therefrom and cut them through by a sliding movement, a gripper arm pivotably mounted on said guiding ring, and having a free end, said first gripping means being mounted at the free end of said gripper arm, guiding tracks positioned under said supporting table and including a stationary portion and a movable portion, said free end of said arm also carrying a roller guided by said guiding tracks, said movable portion constituting means for bringing said first gripping means into alignment with said first gripping means actuating means.

2. A machine for binding bundles of paper pulp in combination, a supporting table for a bundle of paper pulp to be bound with a binding strand, a guiding ring rotatably surrounding said bundle on said supporting table, means on said guiding ring for laying slightly more than one turn of binding strand around said ring during a first cycle of rotation thereof in one direction and for laying said turn of strand around said bundle during a following cycle of rotation of said rotatable member in the opposite direction, means outside of said ring for feeding said strand substantially radially thereto during said first cycle or rotation, a first gripping means on the rotatable member for holding the free end of the binding strand during said first cycle of rotation, means for actuating said first gripping means, stationary gripping means provided below the support for gripping the end of said strand at the end of the said first cycle of rotation to hold it during said cycle of rotation in the opposite direction, means for releasing said strand from the gripping means on the ring after said operation of the stationary gripping means, means for rotating the ring in opposite directions, means under the control of the ring for imparting a return movement to said strand feeding means during said rotation in opposite direction to take up slack of said strand, rotatable means for twisting the strand as laid around said bundle at a point where the part of the strand laid around said bundle overlaps the end of the strand held by the stationary gripping means, means including two cutters slidably mounted on opposite sides of the twisting means for entering in a given angular position of the rotatable twisting means into between the strand parts projecting therefrom and cut them through by a sliding movement for severing inactive portions of said binding material leading to the stationary gripping means and to the feeding means and means for actuating the gripping means mounted on the ring for gripping near the end of the strand leading to the feeding means, a gripper arm pivotably mounted on said guiding ring, and having a free end, said first gripping means being mounted at said free end of said gripper arm, guiding tracks positioned under said supporting table and including a stationary portion and a movable portion, said free end of said arm also carrying a roller guided by said guiding tracks, said movable portion constituting means for bringing said first gripping means into alignment with said first gripping means actuating means.

3. A machine for binding bundles of paper pulp comprising in combination a guiding ring for surrounding a bundle of paper pulp to be bound and having loosely rotatable guiding rollers, a table for supporting the bundle to be bound, first gripper means mounted on said guiding ring for gripping the end of a strand of binding material during winding slightly more than one turn of said binding material around the guiding ring, means for rotating said guiding ring slightly more than one revolution in one direction, feeding means for feeding binding material onto the guiding ring during said winding operation, second gripper mean stationarily mounted under said supporting table for gripping the end of the binding material at the end of said winding operation, means for guiding said first gripper means to said second gripper means, means for releasing said strand from said first gripper means, means for operating said second gripper means to grip said strand substantially simultaneously with the release of said strand by said first gripper means at the beginning of said winding operation, when said first gripper means has passed slightly beyond said second gripper means, means for rotating the guiding ring slightly more than one revolution in the opposite direction after operation of said second gripper means, means under the control of the guiding ring for imparting a return movement to the feeding means during said binding cycle for taking up the slack of the binding strand, twisting means for twisting overlapping portions of the binding strand, cutting means for severing inactive portions of said binding strand leading to said second gripper means and to said feeding means, said cutting means including two cutters slidably mounted on opposite sides of the twisting means for entering in a given angular position of the rotatable twisting means into between the strand parts projecting therefrom and cut them through by a sliding movement, means for actuating said first gripping means for gripping near the end of the binding strand leading to said feeding means and means for biasing the object to be bound against said supporting table.

4. A machine for binding bundles of paper pulp in combination, a guiding ring for winding slightly more than one turn of a strand of binding material around itself upon rotation of the same slightly more than one revolution in one direction and for binding said turn of binding material around a bundle of paper pulp to be bound upon rotation of the said slightly more than one revolution in opposite direction, feeding means for feeding said binding material onto said guiding ring during the winding cycle and for re-feeding part of said binding material from said guiding ring during the binding cycle to take up the slack of the said material, first driving means for rotating said guiding ring and for driving said feeding means, first gripper means mounted on the guiding ring for gripping the binding material during the winding cycle, stationarily mounted second gripper means for gripping the binding material during the binding cycle, means for actuating said first gripper means for gripping the binding material, means for bringing said first gripper means into alignment with said first gripper actuating means at the end of the winding cycle, twisting means for twisting the binding material, cutting means for severing inactive portions of the binding material, and second driving means for driving said first gripper actuating means, said first gripper alignment means, said twisting means, and said cutting means, a gripper arm pivotably mounted on said guiding ring, and having a free end, said first gripper means being mounted at said free end of said gripper arm, guiding tracks positioned under said supporting table and including a stationary portion and a movable portion, said free end of said arm also carrying a roller guided by said guiding tracks, said movable portion constituting said means for bringing said first gripper means into alignment with said first gripper actuating means.

References Cited in the file of this patent
UNITED STATES PATENTS

| | | |
|---|---|---|
| 2,198,440 | Marchand | Apr. 23, 1940 |
| 2,339,395 | Harvey | Jan. 18, 1944 |
| 2,597,675 | Sackett | May 20, 1952 |
| 2,687,083 | Cranston | Aug. 24, 1954 |
| 2,775,140 | Loos | Jan. 11, 1956 |

FOREIGN PATENTS

| | | |
|---|---|---|
| 325,783 | Great Britain | Feb. 17, 1930 |